(12) United States Patent
Lim et al.

(10) Patent No.: US 11,167,347 B2
(45) Date of Patent: Nov. 9, 2021

(54) APPARATUS AND METHOD FOR FEEDING MATERIAL

(71) Applicant: POSCO, Pohang-si (KR)

(72) Inventors: Seung Ho Lim, Pohang-si (KR); Goo Hwa Kim, Pohang-si (KR); Kyung Hoon Nam, Gwangyang-si (KR); Yeong Seon Park, Seoul (KR)

(73) Assignee: POSCO, Pohang-si (KR)

( * ) Notice: Subject to any disclaimer, the term of this patent is extended or adjusted under 35 U.S.C. 154(b) by 245 days.

(21) Appl. No.: 16/470,359

(22) PCT Filed: Aug. 24, 2017

(86) PCT No.: PCT/KR2017/009282
§ 371 (c)(1),
(2) Date: Jun. 17, 2019

(87) PCT Pub. No.: WO2018/110797
PCT Pub. Date: Jun. 21, 2018

(65) Prior Publication Data
US 2019/0308240 A1 Oct. 10, 2019

(30) Foreign Application Priority Data
Dec. 16, 2016 (KR) .................. 10-2016-0172339

(51) Int. Cl.
*B22F 1/00* (2006.01)
*C23F 4/00* (2006.01)
(Continued)

(52) U.S. Cl.
CPC .......... *B22F 1/0088* (2013.01); *C11D 11/007* (2013.01); *C22B 1/005* (2013.01);
(Continued)

(58) Field of Classification Search
CPC .. B22F 1/0088; B22F 2202/13; C11D 11/007; C22B 1/005; C23F 4/00;
(Continued)

(56) References Cited

U.S. PATENT DOCUMENTS 4,445,849 A * 5/1984 Bouille ..................... F27D 3/12
432/128
4,654,076 A 3/1987 Camacho et al.
(Continued)

FOREIGN PATENT DOCUMENTS

JP H06-330197 A 11/1994
JP 2001-082879 A 3/2001
(Continued)

OTHER PUBLICATIONS

Chinese Office Action dated Jan. 20, 2020 issued in Chinese Patent Application No. 201780083659.X (with English translation).
(Continued)

*Primary Examiner* — Scott R Kastler
*Assistant Examiner* — Michael Aboagye
(74) *Attorney, Agent, or Firm* — Morgan, Lewis & Bockius LLP

(57) ABSTRACT

A material feeding apparatus is disclosed. An apparatus for removing a surface oxide of a metal material and feeding the metal material to a melting furnace, according to an embodiment of the present disclosure, includes: a housing including a material dropping chamber for feeding and discharging the metal material and a material etching chamber for performing a plasma etching process; and a pretreatment casing configured to reciprocate between the material dropping chamber and the material etching chamber in the housing, wherein the pretreatment casing receives the metal material from the material dropping chamber to store the metal material, moves to the material etching chamber to plasma-
(Continued)

etch a surface oxide layer of the stored metal material, and then returns to the material dropping chamber to drop the etched metal material into the melting furnace.

10 Claims, 7 Drawing Sheets

(51) Int. Cl.
    *F27D 3/00*     (2006.01)
    *C11D 11/00*     (2006.01)
    *C22B 1/00*     (2006.01)
    *C23G 5/00*     (2006.01)
    *F27D 3/10*     (2006.01)

(52) U.S. Cl.
    CPC ................ *C23F 4/00* (2013.01); *C23G 5/00* (2013.01); *F27D 3/0025* (2013.01); *F27D 3/0033* (2013.01); *F27D 3/10* (2013.01); *B22F 2202/13* (2013.01)

(58) Field of Classification Search
    CPC ....... C23G 5/00; F27D 3/0025; F27D 3/0033; F27D 3/10
    USPC ........ 266/44, 78, 901; 75/10.19, 10.34, 762, 75/401
    See application file for complete search history.

(56) References Cited

U.S. PATENT DOCUMENTS

| | | | | |
|---|---|---|---|---|
| 5,026,240 | A | * | 6/1991 | Kozierok ................ C22B 7/003 414/300 |
| 5,122,181 | A | * | 6/1992 | Dube ...................... C22B 9/228 75/10.21 |
| 5,198,634 | A | * | 3/1993 | Mattson .................. G03F 7/427 134/1.1 |
| 5,405,428 | A | * | 4/1995 | Dube .................. C22B 21/0007 75/403 |
| 6,227,847 | B1 | * | 5/2001 | Gillespie .................. F23G 5/02 110/236 |
| 2016/0186291 | A1 | | 6/2016 | Mills et al. |

FOREIGN PATENT DOCUMENTS

| | | |
|---|---|---|
| JP | 2015-151586 A | 8/2015 |
| KR | 10-2000-0011065 A | 2/2000 |
| KR | 10-2016-0115935 A | 10/2016 |
| RU | 2285048 C2 | 10/2006 |
| RU | 2295574 C2 | 3/2007 |
| WO | 2016/014547 A1 | 1/2016 |

OTHER PUBLICATIONS

Extended European Search Report dated Sep. 13, 2019 issued in European Patent Application No. 17881498.4.
International Search Report and Written Opinion dated Nov. 29, 2017 issued in International Patent Application No. PCT/KR2017/009282 (partial English translation).

* cited by examiner

APPARATUS AND METHOD FOR FEEDING MATERIAL

CROSS-REFERENCE OF RELATED APPLICATIONS

This application is the U.S. National Phase under 35 U.S.C. § 371 of International Patent Application No. PCT/KR2017/009282, filed on Aug. 24, 2017, which in turn claims the benefit of Korean Application No. 10-2016-0172339, filed on Dec. 16, 2016, the entire disclosures of which applications are incorporated by reference herein.

TECHNICAL FIELD

The present disclosure relates to an apparatus and method for feeding a material, and more particularly, to an apparatus and a method for removing a surface oxide layer of a metal material and feeding the metal material to a melting furnace.

BACKGROUND ART

In general, a metal material in the form of powder, granule, and ball has a high surface area per unit volume so that an oxide layer is easily formed on the surface of the metal material.

Particularly, in industrial sites using metal melting furnaces, surface oxidation occurs rapidly because metal materials are stored under poor conditions (high temperature and high humidity).

Therefore, when a metal material is charged into a melting furnace, oxides with high melting temperature float on the surface of the molten metal to prevent evaporation or to make it difficult to predict correct metallurgical compositions of the molten metal.

Accordingly, pickling and water washing are performed before a metal material is fed to a melting furnace. However, highly reactive metals in the atmosphere form fine oxide layers thereon as soon as they are exposed to the atmosphere after wet treatment, and the degree of oxidation increases over time, which makes it difficult to manage the material and also makes feeding of high purity materials impossible.

DISCLOSURE

Technical Problem

The present disclosure is directed to providing an apparatus and method for continuously feeding a metal material to a melting furnace after removing an oxide layer of the metal material.

Technical Solution

In accordance with one aspect of the present disclosure, there may be provided an apparatus for removing a surface oxide of a metal material and feeding the metal material to a melting furnace, including: a housing including a material dropping chamber for feeding and discharging the metal material and a material etching chamber for performing a plasma etching process; and a pretreatment casing configured to reciprocate between the material dropping chamber and the material etching chamber in the housing, wherein the pretreatment casing receives the metal material from the material dropping chamber to store the metal material, moves to the material etching chamber to plasma-etch a surface oxide layer of the stored metal material, and then returns to the material dropping chamber to drop the etched metal material into the melting furnace.

Also, the pretreatment casing may be rotatably installed, and when the pretreatment casing is located in the material etching chamber to perform the plasma-etch process, the pretreatment casing may rotate to stir the metal material.

Also, a plurality of holes may be formed in an outer surface of the pretreatment casing to allow plasma to enter and exit an inside of the pretreatment casing.

Also, an entrance for feeding and discharging the metal material and a cover for selectively opening and closing the entrance may be provided in an outer surface of the pretreatment casing, the cover may be rotatably installed along an outer circumference of the pretreatment casing, held at a position to close the entrance by a compressive force of an elastic rod coupled to the pretreatment casing, and held at a position to open the entrance by a compressive force of a clamp installed to selectively contact the cover.

Also, the housing may include a heater for heating the material etching chamber to preheat the metal material filled in the pretreatment casing.

Also, an inclined guide surface may be provided in the pretreatment casing adjacent to the entrance to guide the metal material inclined to one side in the pretreatment casing to be discharged smoothly through the entrance.

Also, an inlet port connected to a material supply unit for feeding the metal material may be provided in an upper portion of the material dropping chamber, and an outlet port connected to the melting furnace may be provided in a lower portion of the material dropping chamber.

Also, the material supply unit may include a storage hopper for storing the metal material and a weighing hopper for receiving the metal material from the storage hopper and weighing the metal material to feed the metal material to the inlet port, a buffer hopper for temporarily storing the etched metal material discharged from the outlet port in a vacuum state and providing the etched metal material to the melting furnace may be provided between the material dropping chamber and the melting furnace.

Also, the pretreatment casing may be connected to a support shaft penetrating one side of the housing and extending, and the support shaft may be axially connected to a driving motor to receive a rotation force from the driving motor to rotate and reciprocate in association with an actuator provided outside the housing.

Also, one side of the housing may be connected to a vacuum generator for forming a vacuum atmosphere in the material etching chamber and a gas feeder for feeding a reactive gas to the material etching chamber, when the pretreatment casing is located in the material etching chamber.

In accordance with another aspect of the present disclosure, there may be provided a method for feeding a metal material to a melting furnace, including: providing the metal material stored in a storage hopper to a weighing hopper; introducing the metal material weighed in the weighing hopper into a pretreatment casing disposed in a chamber of a housing; forming a vacuum in the chamber and injecting a reactive gas into the chamber to perform a plasma etching process to remove a surface oxide of the metal material; and feeding the metal material from which the surface oxide has been removed in the pretreatment casing to the melting furnace.

Also, the method may further include rotating the pretreatment casing during the plasma etching process.

Also, the performing of the plasma etching process may further include heating the material etching chamber to perform preheating of the metal material stored in the pretreatment casing.

Also, the feeding of the metal material from which the surface oxide has been removed to the melting furnace may be performed in the same atmosphere as the melting furnace.

Also, the pretreatment casing may move between a material dropping chamber and a material etching chamber partitioned from each other in the chamber to perform processes of feeding and discharging the metal material and etching the metal material.

Advantageous Effects

According to the embodiments of the present disclosure, by feeding a metal material from which an oxide layer has been removed to a melting furnace, a high purity metal material may be fed to the melting furnace.

In addition, according to the embodiments of the present disclosure, by removing a surface oxide layer of a metal material and raising the temperature of a metal material introduced into the melting furnace, temperature fluctuations of a molten metal and occurrence of a drift in the melting furnace may be reduced.

Furthermore, according to the embodiments of the present disclosure, a metal material may be fed under the same conditions as the atmosphere of a melting furnace, so that continuous feeding may be performed without occurrence of any additional oxide layer.

MODES OF THE INVENTION

Figure 1:
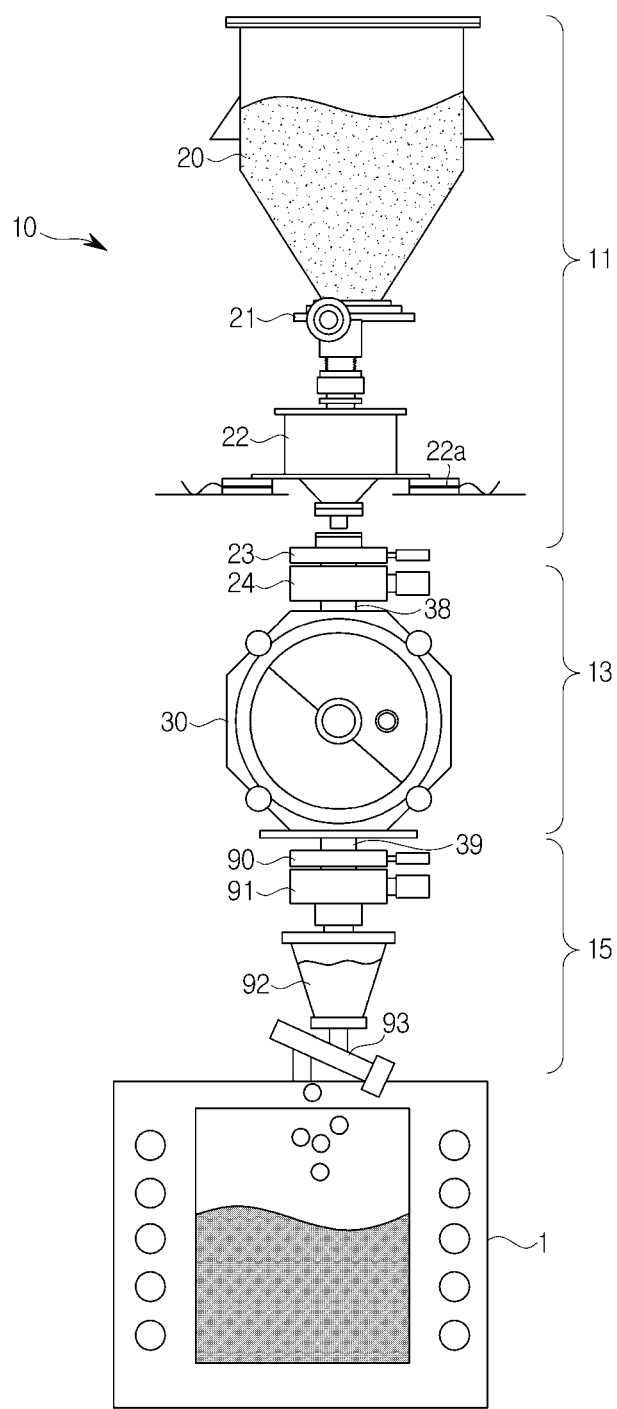
FIG. 1 schematically shows an apparatus for feeding a metal material to a melting furnace, according to an embodiment of the present disclosure.

Hereinafter, embodiments of the present disclosure will be described in detail with reference to the accompanying drawings. The following embodiments are provided to sufficiently transfer the technical concepts of the disclosure to one of ordinary skill in the art. However, the disclosure is not limited to these embodiments, and may be embodied in another form. In the drawings, parts that are irrelevant to the descriptions may be not shown in order to clarify the disclosure, and also, for easy understanding, the widths, lengths, thicknesses, etc. of components are more or less exaggeratedly shown. Like numbers refer to like elements throughout this specification.

Figure 2:
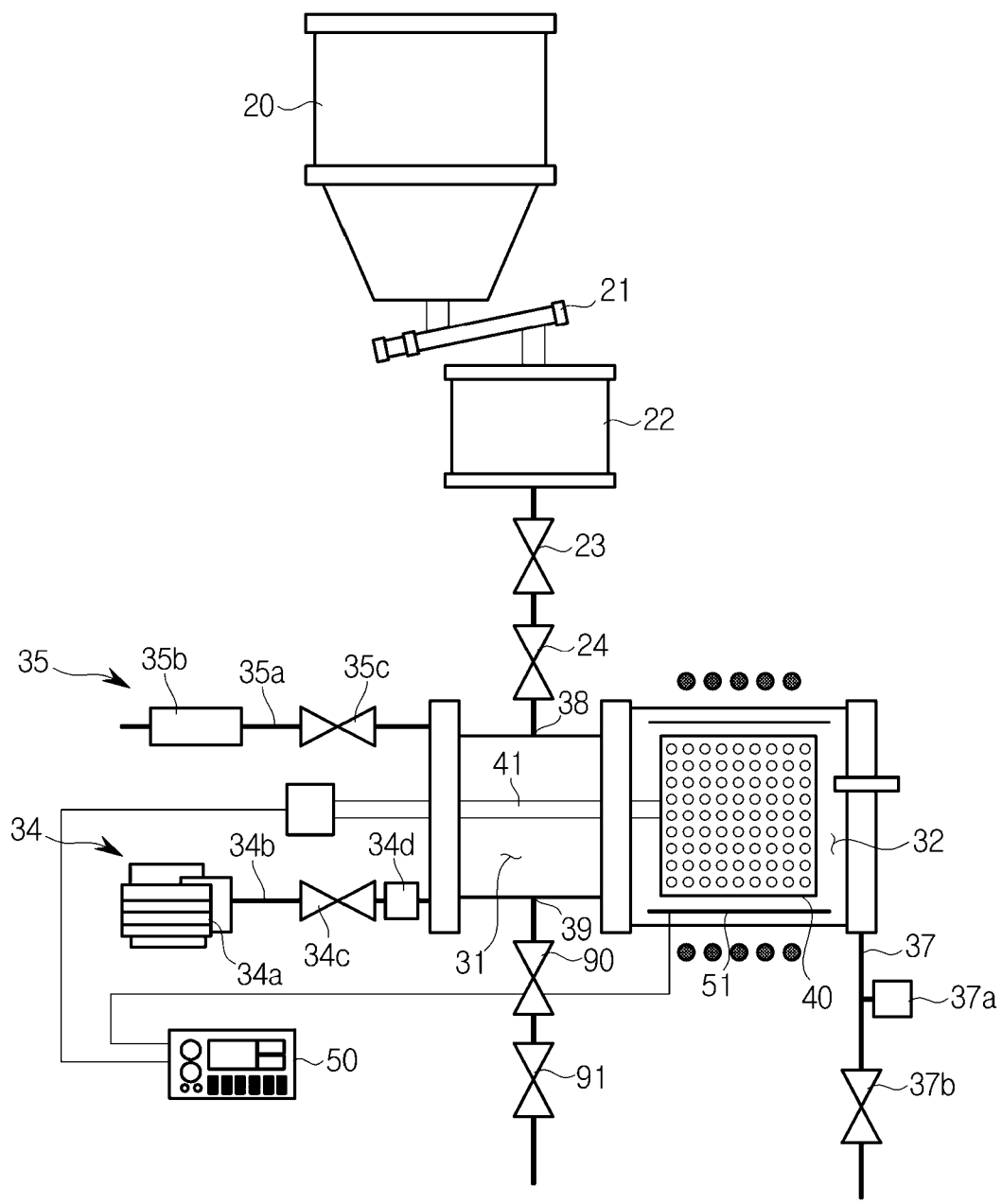
FIG. 2 schematically shows a configuration for performing a plasma etching process, according to an embodiment of the present disclosure.
Figure 3:
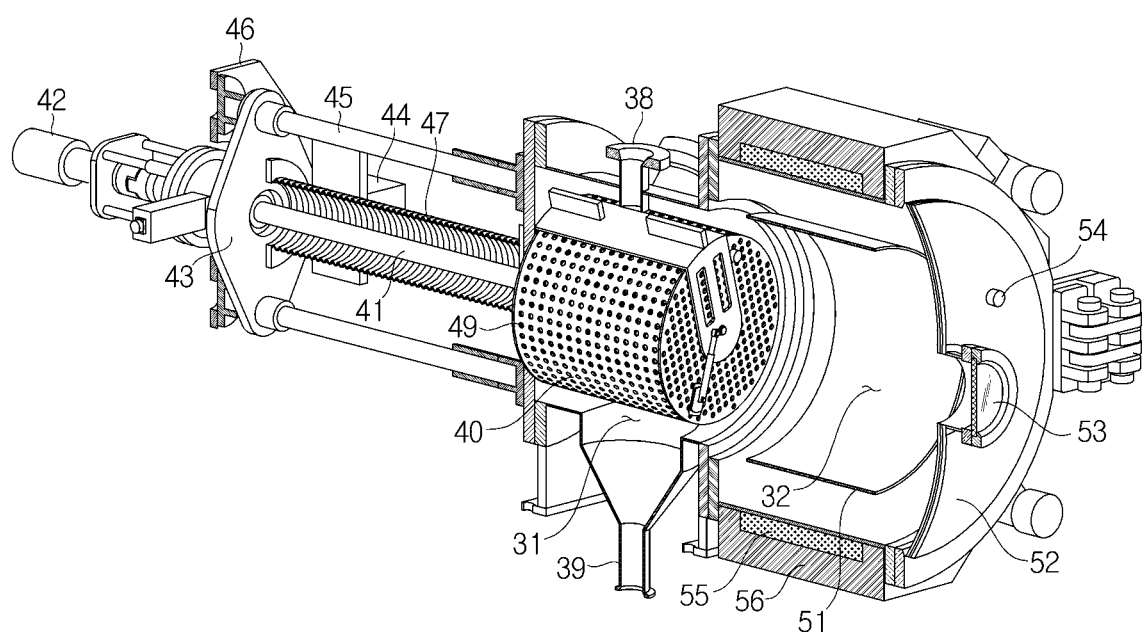
FIG. 3 is a partially cross-sectional perspective view showing an inside of a material treatment unit when a metal material is charged and discharged, according to an embodiment of the present disclosure.
Figure 4:
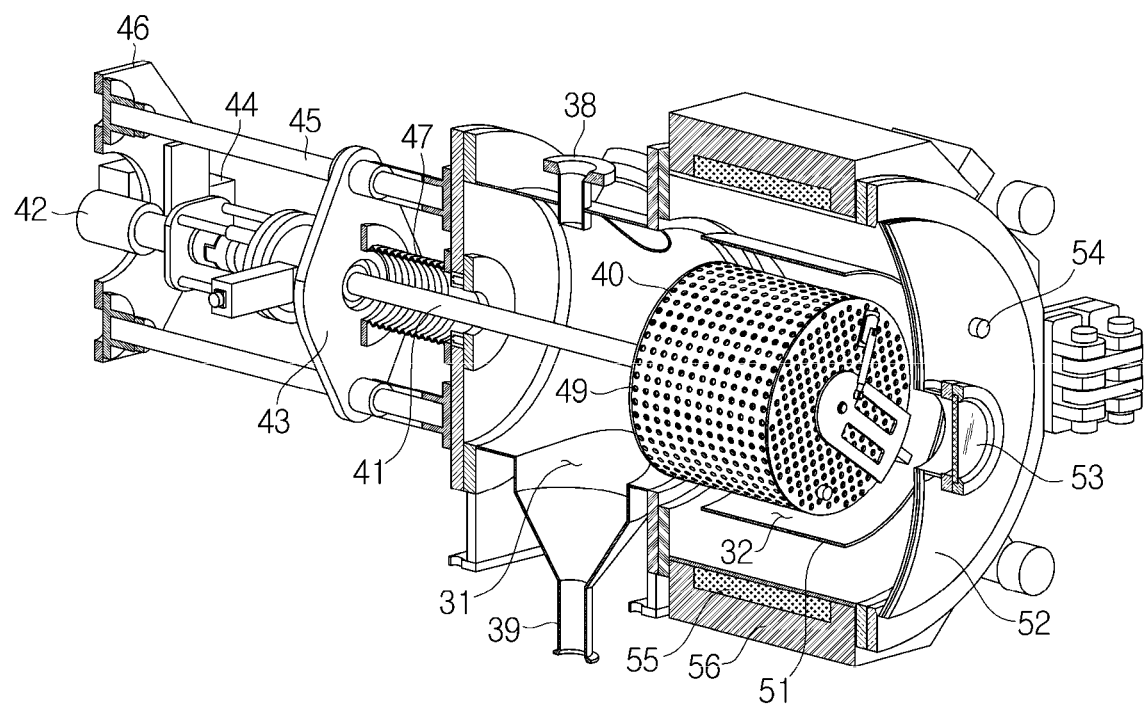
FIG. 4 is a partially cross-sectional perspective view showing an inside of a material treatment unit when a metal material is plasma-etched, according to an embodiment of the present disclosure.

FIG. 1 schematically shows an apparatus for feeding a metal material to a melting furnace, according to an embodiment of the present disclosure, FIG. 2 schematically shows a configuration for performing a plasma etching process, according to an embodiment of the present disclosure, FIG. 3 is a partially cross-sectional perspective view showing an inside of a material treatment unit when a metal material is charged and discharged, according to an embodiment of the present disclosure, and FIG. 4 is a partially cross-sectional perspective view showing an inside of a material treatment unit when a metal material is plasma-etched, according to an embodiment of the present disclosure.

Referring to FIGS. 1 to 4, a material feeding apparatus 10 according to an embodiment of the present disclosure may be used to continuously feed a metal material in the form of a powder, granule, or ball to a melting furnace 1 after removing an oxide layer on a surface of the metal material before charging the metal material into the melting furnace 1.

The material feeding apparatus 10 may include a material supply unit 11 for storing and supplying a metal material, a material treatment unit 13 for removing an oxide layer from a surface of the metal material provided from the material supply unit 11, and a material feed unit 15 for feeding the metal material processed in the material treatment unit 13 into the melting furnace 1.

The material supply unit 11 may include a storage hopper 20 and a weighing hopper 22 connected to a lower portion of the storage hopper 20.

The storage hopper 20 may store the metal material at atmospheric pressure. The storage hopper 20 may have a sufficient storage capacity in consideration of time for which the metal material is supplied to the storage hopper 20 from the outside while the metal material is continuously supplied to the weighing hopper 22.

In addition, the storage hopper 20 may include a proximity sensor (not shown) for measuring a storage amount of the metal material, wherein the proximity sensor may be installed at regular intervals in a height direction of the storage hopper 20.

The metal material discharged from the storage hopper 20 may be supplied to the weighing hopper 22 through a storage hopper feeder 21 connected to the lower portion of the storage hopper 20.

The storage hopper feeder 21 may include a screw feeder, a vibration feeder, a conveyor, and the like, depending on the type of the metal material.

The metal material conveyed by the storage hopper feeder 21 may be provided to the weighing hopper 22 for precisely weighing an input amount of the metal material.

The metal material provided to the weighing hopper 22 may be weighed by a load cell 22a installed on a lower portion of the weighing hopper 22, and the weighed metal material may be provided to the material treatment unit 13.

Between the weighing hopper 22 and the material treatment unit 13, an upper screen 23 for controlling discharging of the metal material weighed by the weighing hopper 22 and an upper vacuum valve 24 for selectively blocking a passage through which the metal material moves from the weighing hopper 22 to the material treatment unit 13 may be provided.

The upper screen 23 may sort the metal material provided from the weighing hopper 22 according to predetermined sizes to provide the metal material to the material treatment unit 13. The upper vacuum valve 24 may block a passage connecting the material supply unit 11 to the material treatment unit 13 when the material treatment unit 13 processes the metal material, thereby preventing the material treatment unit 13 from communicating with outside air.

The material treatment unit 13 may include a housing 30 for receiving the metal material supplied from the material supply unit 11 and removing a surface oxide layer of the metal material through a plasma etching process.

The housing 30 may have hollow chambers 31 and 32. The hollow chambers 31 and 32 may include a material dropping chamber 31 for receiving the metal material supplied from the material supply unit 11 or providing the metal material to the melting furnace 1 located below, and a material etching chamber 32 for plasma-etching the metal material, the material etching chamber 32 partitioned from the material dropping chamber 31.

In the chambers 31 and 32, a pretreatment casing 40 for accommodating the metal material supplied through the material dropping chamber 31 may be movably and rotatably located.

The pretreatment casing 40 may be in the shape of a cylinder. The pretreatment casing 40 may reciprocate between the material dropping chamber 31 and the material etching chamber 32, and rotate together with a support shaft 41 connected to the rear portion.

A front end of the support shaft 41 may be connected to a rear center portion of the pretreatment casing 40. A rear end of the support shaft 41 may penetrate a rear surface of the housing 30, extend outward, and then be axially connected to a driving motor 42.

The driving motor 42 may be connected to a sliding member 43 installed to be slidable back and forth behind the housing 30, and may move together with the sliding member 43.

The sliding member 43 may move back and forth toward the rear surface of the housing 30 along a pair of guide rods 45 arranged up and down, by driving of an actuator 44.

Both ends of the pair of guide rods 45 may be respectively connected to and supported by the rear surface of the housing 30 and a rod frame 46 spaced apart from the rear surface of the housing 30.

The rod frame 46 may be coupled with the actuator 44 connected to the sliding member 43 and configured to move the sliding member 43 back and forth.

The actuator 44, which is a device for moving the sliding member 43 back and forth, may include a cylinder operating by an electric motor or hydraulic or pneumatic pressure, and an appropriate driving element, such as a ball screw, a rack and pinion, etc. for moving the sliding member 43 back and forth through the electric motor or the cylinder.

The support shaft 41 may penetrate the sliding member 43 to be connected to a shaft of the driving motor 42 by means of a coupling member. Also, a shrinkable bellows 47 for maintaining airtightness may be provided around an outer surface of the support shaft 41 disposed between the sliding member 43 and the rear surface of housing 30 so as to surround the support shaft 41.

Therefore, the pretreatment casing 40 may reciprocate between the material dropping chamber 31 and the material etching chamber 32 together with the sliding member 43 moving back and forth along the pair of guide rods 45 by driving of the actuator 44, and rotate together with the supporting shaft 41 rotating by power of the driving motor 42.

One side of the housing 30 may be connected to a vacuum generator 34 for creating a vacuum in the insides of the chambers 31 and 32.

The vacuum generator 34 may include a vacuum pump 34a for reducing pressure in the chambers 31 and 32, and a vacuum pipe 34b for connecting the vacuum pump 34a to the chambers 31 and 32.

A pressure controller, a pressure gauge, or a relief valve 34c may be connected to the vacuum pipe 34b. Also, the vacuum pipe 34b may be provided with a filter 34d to prevent backflow of the metal material during initial vacuum generation at atmospheric pressure.

The vacuum generator 34 may reduce inside pressure of the chambers 31 and 32 to form a vacuum atmosphere when the pretreatment casing 40 is located in the material etching chamber 32.

Also, a gas feeder 35 for injecting a reaction gas into the chambers 31 and 32 may be connected to the housing 30.

The gas feeder 35 may feed a reaction gas (Ar-4% $H_2$) obtained by mixing argon which is an inert gas with a very small amount of hydrogen which is a reducing base to generate plasma.

The gas feeder 35 may include a gas pipe 35a connected to the chambers 31 and 32, a mass flow controller (MFC) 35b for precisely controlling a flow rate of the reaction gas flowing into the gas pipe 35a, and a valve 35c.

An exhaust pipe 37 for exhausting a reaction gas in the chambers 31 and 32 may be connected to a bottom of the housing 30. A pressure sensor 37a for measuring inside pressure of the chambers 31 and 32 and an exhaust valve 37b for opening and closing the exhaust pipe 37 may be installed in the exhaust pipe 37.

An inlet port 38 connected to the material supply unit 11 and an outlet port 39 connected to the melting furnace 1 may be respectively provided in an upper portion and a lower portion of the material dropping chamber 31.

When the pretreatment casing 40 is located in the material dropping chamber 31, a metal material provided through the inlet port 38 may enter the inside of the pretreatment casing 40 through an entrance 48 (see FIG. 6) formed in the pretreatment casing 40, and then, after the pretreatment casing 40 moves to the material etching chamber 32, the metal material may be may be plasma-etched.

The material etching chamber 32 may be a space where a dry etching process using plasma is performed on the metal material stored in the pretreatment casing 40.

When the pretreatment casing 40 is located in the material etching chamber 32, a reaction gas may be supplied into the chambers 31 and 32 through the gas feeder 35, and inside pressure of the chambers 31 and 32 may be maintained at operating pressure through the vacuum generator 34.

The pretreatment casing 40 containing a metal material for forming an electromagnetic field in the chambers 31 and 32 may be electrically connected to a power supply apparatus 50 by means of the support shaft 41. A cylindrical electrode casing 51 disposed to surround the outer circumference of the pretreatment casing 40 in the material etching chamber 32 may be electrically connected to the power supply apparatus 50.

The power supply apparatus 50 may supply a negative current to the pretreatment casing 40 and a positive current to the electrode casing 51 to form an electromagnetic field in the material etching chamber 32, thereby generating plasma from the reaction gas supplied into the chambers 31 and 32. That is, the pretreatment casing 40 and the electrode casing 51 may serve as electrodes for forming plasma.

In the pretreatment casing 40, a plurality of holes 49 may be formed at predetermined intervals along a circumferential direction and an axial direction of the pretreatment casing 40 to allow the plasma to enter and exit the inside of the pretreatment casing 40. Accordingly, the plasma generated between the pretreatment casing 40 and the electrode casing 51 may move to the inside and outside of the pretreatment casing 40 through the plurality of holes 49 to etch the surface oxide layer of the metal material stored in the pretreatment casing 40.

The plurality of holes 49 formed in the pretreatment casing 40 may be smaller than a size of the metal material introduced in the inside of the pretreatment casing 40, so that the metal material introduced to the inside of the pretreatment casing 40 does not flow out. In addition, a plurality of through holes (not shown) may be formed in the electrode casing 51 to facilitate plasma generation.

Meanwhile, plasma generation in the material etching chamber 32 as described above may be an example, and it will be obvious that plasma generation can be induced by using a capacitive coupled plasma type or an inductive coupled plasma type well known in the art in the material etching chamber 32. Also, in this case, the inside of the pretreatment casing 40 may be used as a space for plasma generation.

A door 52 may be provided at one side of the housing 30 forming the material etching chamber 32 so as to be opened and closed. The door 52 may open and close the housing 30 to periodically remove etched materials accumulated in the material etching chamber 32 in which a plasma process is performed. A transparent window 53 may be provided on the door 52 so as to allow a user to observe a contamination state of the inside of the material etching chamber 32.

An optical emission spectroscope sensor 54 for analyzing a spectrum of light emitted from plasma generated in the material etching chamber 32 may be installed on the door 52.

The emission spectroscopic sensor 54 may determine a presence of neutral species and ions by measuring a wavelength and intensity of light emitted from the material etching chamber 32. That is, because a spectrum of light emitted from plasma provides information about chemical and physical processes occurring in the plasma, the emission spectroscopic sensor 54 may measure wavelength changes inside the material etching chamber 32, and when a relative intensity of a predetermined wavelength band increases, a plasma-etch process of the metal material may terminate.

A heater 55 for heating the inside of the material etching chamber 32 may be installed around an inner wall of the housing 30 forming the material etching chamber 32.

When a metal material in the pretreatment casing 40 moved to the inside of the material etching chamber 32 is supplied to the melting furnace 1 at a temperature that is lower than that of the melting furnace 1, a temperature gradient of a molten metal may become significant and a drift may occur, which makes it difficult to secure the quality of the molten metal according to use purposes of the molten metal. The heater 55 may be a device for preheating the metal material to prevent the problem.

That is, when the temperature of the metal material is raised by a plasma process but sufficient preheat temperature is not secured at which the metal material can be introduced into the melting furnace 1, the heater 55 may heat the material etching chamber 32 so as to preheat the metal material in the pretreatment casing 40 by an indirect heating method.

The heater 55 may use a voltage that is higher than a plasma discharge voltage. An insulator 56 and a cooling jacket (not shown) may be provided on the housing 30 outside the heater 55 to prevent surrounding structures (operating systems, valves, etc.) from being damaged due to heat of the heater 55.

The introduction of the metal material supplied through the inlet port 38 into the pretreatment casing 40 and the discharge of the metal material from the pretreatment casing 40 toward the outlet port 39 may be performed through the entrance 48 formed in the pretreatment casing 40.

Figure 5:
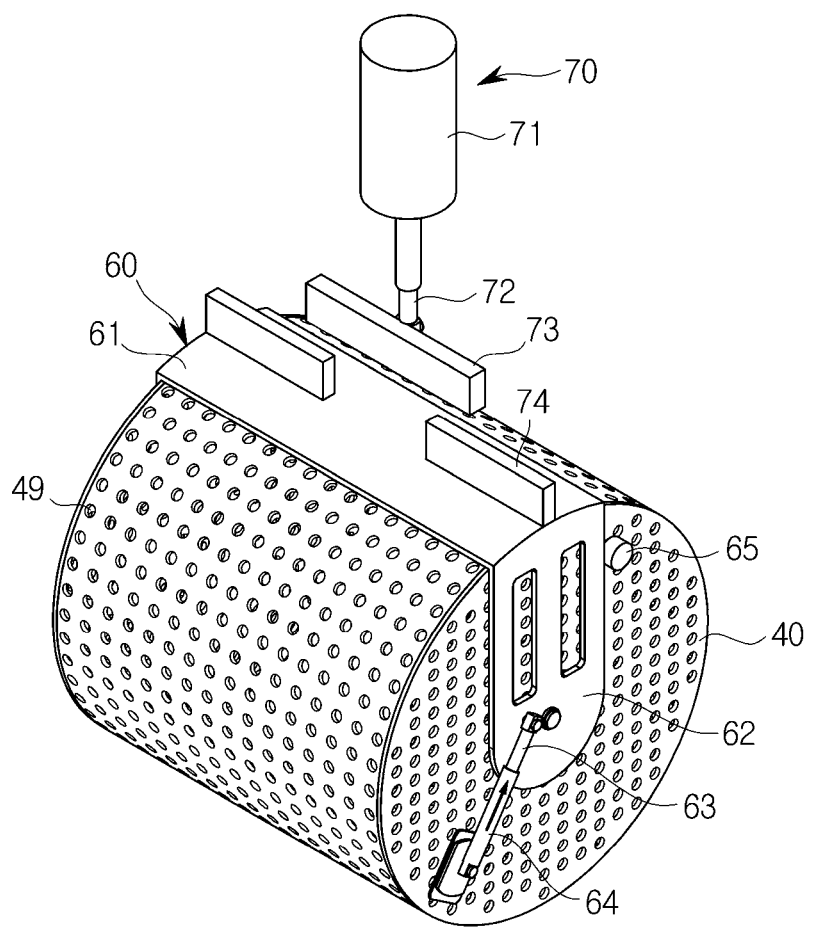
FIG. 5 shows a state in which an entrance of a pretreatment casing is closed, according to an embodiment of the present disclosure.
Figure 6:
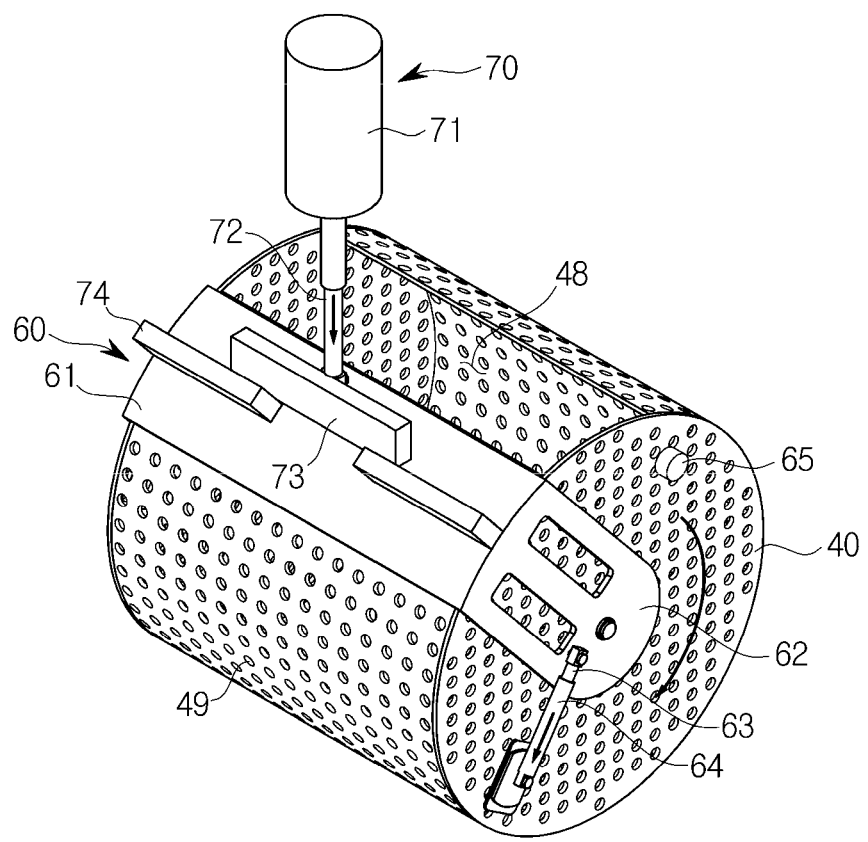
FIG. 6 shows a state in which an entrance of a pretreatment casing is opened, according to an embodiment of the present disclosure.
Figure 7:
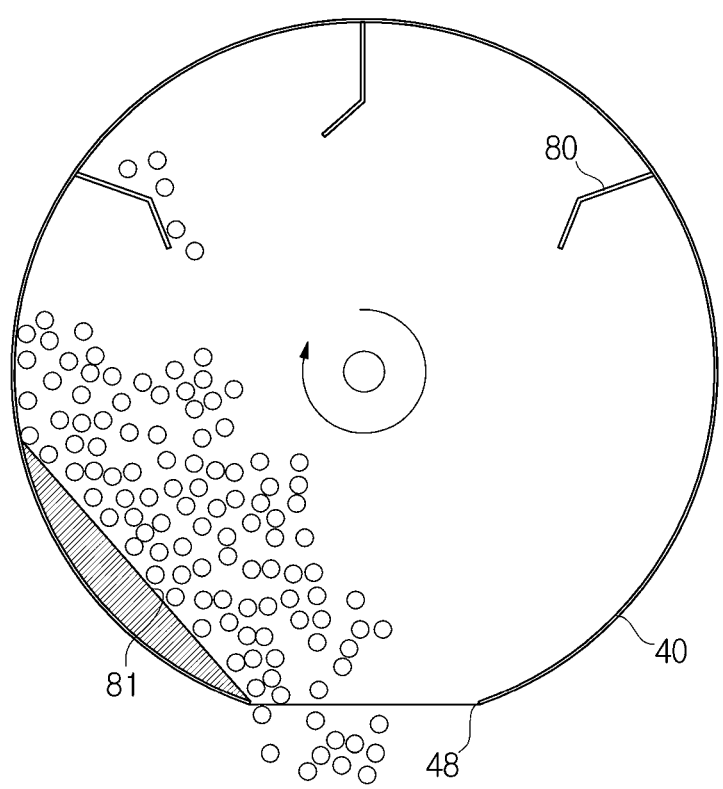
FIG. 7 shows an inside of a pretreatment casing according to an embodiment of the present disclosure.

FIG. 5 shows a state in which an entrance of a pretreatment casing is closed, according to an embodiment of the present disclosure, FIG. 6 shows a state in which an entrance of a pretreatment casing is opened, according to an embodiment of the present disclosure, and FIG. 7 shows an inside of a pretreatment casing according to an embodiment of the present disclosure.

Referring to FIGS. 5 to 7, the entrance 48 having a predetermined width and cut in a longitudinal direction may be formed at a predetermined position along the circumferential direction of the pretreatment casing 40. The entrance 48 may be selectively opened and closed by a cover 60 configured to rotate along the outer circumference of the pretreatment casing 40.

The cover 60 may be formed with a size corresponding to the entrance 48, and may include a cover panel 61 for selectively opening and closing the entrance 48, and a support panel 62 that is bent in a vertical direction at both ends of the cover panel 61 and rotatably coupled to a central shaft of the pretreatment casing 40.

The support panel 62 may be pressed and supported in a direction in which the cover panel 61 closes the entrance 48 by a compressive force of an elastic rod 63 coupled to a side wall of the pretreatment casing 40.

The elastic rod 63 may be supported by a spring disposed in the inside of a rod housing 64 to move back and forth into and out of the rod housing 64, and may press the support panel 62 in the direction in which the cover 60 closes the entrance 48 by a compressive force of the spring.

The support panel 62 pressed by the elastic rod 63 may move to a position at which the cover panel 61 is caught by a stopper 65 protruding from the side wall of the pretreatment casing 40 to close the entrance 48.

When the entrance 40 is opened, a clamp 70 provided at a position adjacent to the inlet port 38 may press an upper surface of the cover panel 61, and the pretreatment casing 40 may rotate by a predetermined angle so that the cover panel 61 opens the entrance 48.

The clamp 70 may include an upper clamp for opening the entrance 48 at a position of the inlet port 38, and a lower clamp for opening the entrance 48 at a position of the outlet port 39.

The clamp 70 may include a rod portion 72 connected to a cylinder 71 provided on the inner wall of the housing 30 to move up and down, and a contact portion 73 provided to press and contact the cover panel 61 at an end of the rod portion 72.

The contact portion 73 may be formed in the shape of a long rod extending in both side directions at one end of the rod portion 72, and when the pretreatment casing 40 rotates, the contact portion 73 may press a surface of the cover panel 61 to restrict a rotation of the cover 60.

For a smoother operation when the rotation of the cover 60 is restricted by the contact portion 73, an interference protrusion 74 interfering with the contact portion 73 may protrude from the surface of the cover panel 61.

Therefore, when a metal material is introduced from the inlet port 38 provided in the housing 30, the clamp 70 may restrict the cover 60 and then the pretreatment casing 40 may rotate by a predetermined angle to open the entrance 4, and when the clamp 70 releases the cover 60, the entrance 48 may be closed by a compressive force of the elastic rod 63.

Also, when the metal material contained in the pretreatment casing 40 is discharged through the outlet port 39, the clamp 70 positioned adjacent to the outlet port 39 may perform the same operation to open and close the entrance 48.

Meanwhile, a lift 80 for stirring the metal material when the pretreatment casing 40 rotates as shown in FIG. 7 may be provided in the pretreatment casing 40.

The lift 80 may extend by a predetermined length from the inner wall of the pretreatment casing 40 toward the center of the pretreatment casing 40 so as to raise the metal material inside the pretreatment casing 40 to a predetermined position and then drop the metal material when the pretreatment casing 40 rotates.

In addition, an inclined guide surface 81 may be provided at a position adjacent to the entrance 48 of the pretreatment casing 40 to improve the flowability of the metal material so that no residue remains when the metal material is discharged.

Therefore, a metal material inclined to one side (left side in the drawing) of the pretreatment casing 40 by a rotation of the pretreatment casing 40 may slide along the inclined guide surface 81 and thus be discharged smoothly through the entrance 48.

Referring again to FIGS. 1 and 2, a lower screen 90 and a lower vacuum valve 91 may be connected to a lower portion of the outlet port 39 of the housing 30. The lower screen 9') may sort the metal material supplied to the melting furnace 1 according to predetermined sizes. The lower vacuum valve 91 may selectively open and close a passage connected to the melting furnace 1 to block outside air.

A buffer hopper 92 may be connected to a lower portion of the lower vacuum valve 91.

The buffer hopper 92 may temporarily store a metal material from which an oxide layer has been removed, in a vacuum state, and continuously supply the metal material to the melting furnace 1 through an inlet 93 connected to a lower portion thereof.

Hereinafter, an operation of the material feeding apparatus according to an embodiment of the present disclosure will be described.

In order to continuously feed a metal material to the melting furnace 1, a metal material stored at atmospheric pressure in the storage hopper 20 may be transferred to the weighing hopper 22 to measure an unit feed amount, and then supplied to the inlet port 38 of the housing 30 when the upper screen 23 and the upper vacuum valve 24 are opened.

At this time, the pretreatment casing 40 may be located in the material dropping chamber 31, and the cover 60 may open the entrance 48. That is, the pretreatment casing 40 may rotate by a predetermined angle by the driving motor 42 in a state in which the upper clamp 70 presses and supports the cover 60, so that the entrance 48 of the pretreatment casing 40 is opened.

Further, the insides of the chambers 31 and 32 may be at atmospheric pressure, and pressure may be adjusted through the exhaust valve 37b based on information sensed by the pressure sensor 37a.

When a metal material introduced through the inlet port 38 is completely supplied into the pretreatment casing 40, the upper screen 23 and the upper vacuum valve 24 may be closed.

Also, the cover 60 may close the entrance 48, and the pretreatment casing 40 may move to the material etching chamber 32 by driving of the actuator 44. At the same time, the insides of the chambers 31 and 32 may reach predetermined vacuum pressure by the vacuum generator 34, and a reaction gas may be injected into the insides of the chambers 31 and 32 by the gas feeder 35.

Thereafter, the power supply apparatus 50 may apply power so that plasma may be generated in the inside of the material etching chamber 32 to remove a surface oxide layer of the metal material.

In a plasma-etch process of the metal material, the pretreatment casing 40 may rotate by the driving motor 42 so that the metal material filled in the pretreatment casing 40 is uniformly stirred to be exposed to plasma.

A time at which plasma-etching and reduction treatment of the metal material terminates may be when a relative intensity of a predetermined wavelength band increases based on information sensed by the emission spectroscopic sensor 54.

Meanwhile, when the metal material to be fed to the melting furnace 1 by the plasma process does not sufficiently secure preheat temperature, the material etching chamber 32 may be heated by the heater 55 to preheat the metal material to appropriate temperature at which the metal material can be introduced into the melting furnace 1.

As a result, a problem that a temperature gradient of the molten metal becomes significant and a drift occurs when a metal material of relatively low temperature is supplied to the high-temperature melting furnace 1, which makes it difficult to secure the quality of the molten metal, may be solved.

When it is determined that the surface oxide layer of the metal material is completely removed in the material etching chamber 32, the actuator 44 may be driven to move the pretreatment casing 40 to the material dropping chamber 31.

A vacuum suction gas or an inert gas may be injected to the insides of the chambers 31 and 32 through the vacuum generator 34 or the gas feeder 35 so as to form the same atmosphere as the inside of the melting furnace 1. This may be to feed the metal material while maintaining the atmosphere of the melting furnace 1 so as to prevent additional oxidation when feeding the metal material into the vacuum or inert gas atmosphere of the melting furnace 1.

When the insides of the chambers 31 and 32 become the same condition as the inside of the melting furnace 1, the lower screen 90 and the lower vacuum valve 91 connected to the outlet port 39 may be sequentially opened, and the entrance 48 of the pretreatment casing 40 may be opened to feed the metal material to the melting furnace 1 or the buffer hopper 92.

When the feeding of the metal material is completed, the above-described process of closing the lower screen 90 and the lower vacuum valve 91, exhausting the gas remaining in the insides of the chambers 31 and 32 through the exhaust pipe 37, and then again receiving a metal material may be repeated.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. An apparatus for removing a surface oxide of a metal material and feeding the metal material to a melting furnace, comprising:
a housing including a material dropping chamber for feeding and discharging the metal material and a material etching chamber for performing a plasma etching process; and
a pretreatment casing configured to rotate and reciprocate backward and forward by a support shaft between the material dropping chamber and the material etching chamber in the housing,
wherein the pretreatment casing moves backward to be disposed in the material dropping chamber to receive the metal material from a material supply unit which is connected to the material dropping chamber to store the metal material, wherein the pretreatment casing moves forward to be disposed in the material etching chamber to plasma-etch a surface oxide layer of the stored metal material, and then returns to the material dropping chamber to drop the etched metal material into the melting furnace.

2. The apparatus according to claim 1,
wherein the pretreatment casing is rotatably installed, and when the pretreatment casing is located in the material etching chamber to perform the plasma-etch process, the pretreatment casing rotates to stir the metal material.

3. The apparatus according to claim 1,
wherein a plurality of holes are formed in an outer surface of the pretreatment casing to allow plasma to enter and exit an inside of the pretreatment casing.

4. The apparatus according to claim 1,
wherein an entrance for feeding and discharging the metal material and a cover for selectively opening and closing the entrance are provided in an outer surface of the pretreatment casing,
the cover is rotatably installed along an outer circumference of the pretreatment casing, held at a position to close the entrance by a compressive force of an elastic rod coupled to the pretreatment casing, and held at a position to open the entrance by a compressive force of a clamp installed to selectively contact the cover.

5. The apparatus according to claim 1,
wherein the housing includes a heater for heating the material etching chamber to preheat the metal material filled in the pretreatment casing.

6. The apparatus according to claim 4,
wherein an inclined guide surface is provided in the pretreatment casing adjacent to the entrance to guide the metal material inclined to one side in the pretreatment casing to be discharged smoothly through the entrance.

7. The apparatus according to claim 1,
wherein an inlet port is connected to the material supply unit for feeding the metal material at an upper portion of the material dropping chamber, and an outlet port connected to the melting furnace is provided in a lower portion of the material dropping chamber.

8. The apparatus according to claim 7,
wherein the material supply unit comprises a storage hopper for storing the metal material and a weighing hopper for receiving the metal material from the storage hopper and weighing the metal material to feed the metal material to the inlet port,
a buffer hopper for temporarily storing the etched metal material discharged from the outlet port in a vacuum state and providing the etched metal material to the melting furnace is provided between the material dropping chamber and the melting furnace.

9. The apparatus according to claim 1,
wherein the pretreatment casing is connected to the support shaft penetrating one side of the housing and extending, and the support shaft is axially connected to a driving motor to receive a rotation force from the driving motor to rotate and reciprocate in association with an actuator provided outside the housing.

10. The apparatus according to claim 1,
wherein one side of the housing is connected to a vacuum generator for forming a vacuum atmosphere in the material etching chamber and a gas feeder for feeding a reactive gas to the material etching chamber, when the pretreatment casing is located in the material etching chamber.

* * * * *